I. M. O'DONEL.
Manufacture of Glass and other Molds.
No. 226,873.                     Patented April 27, 1880.
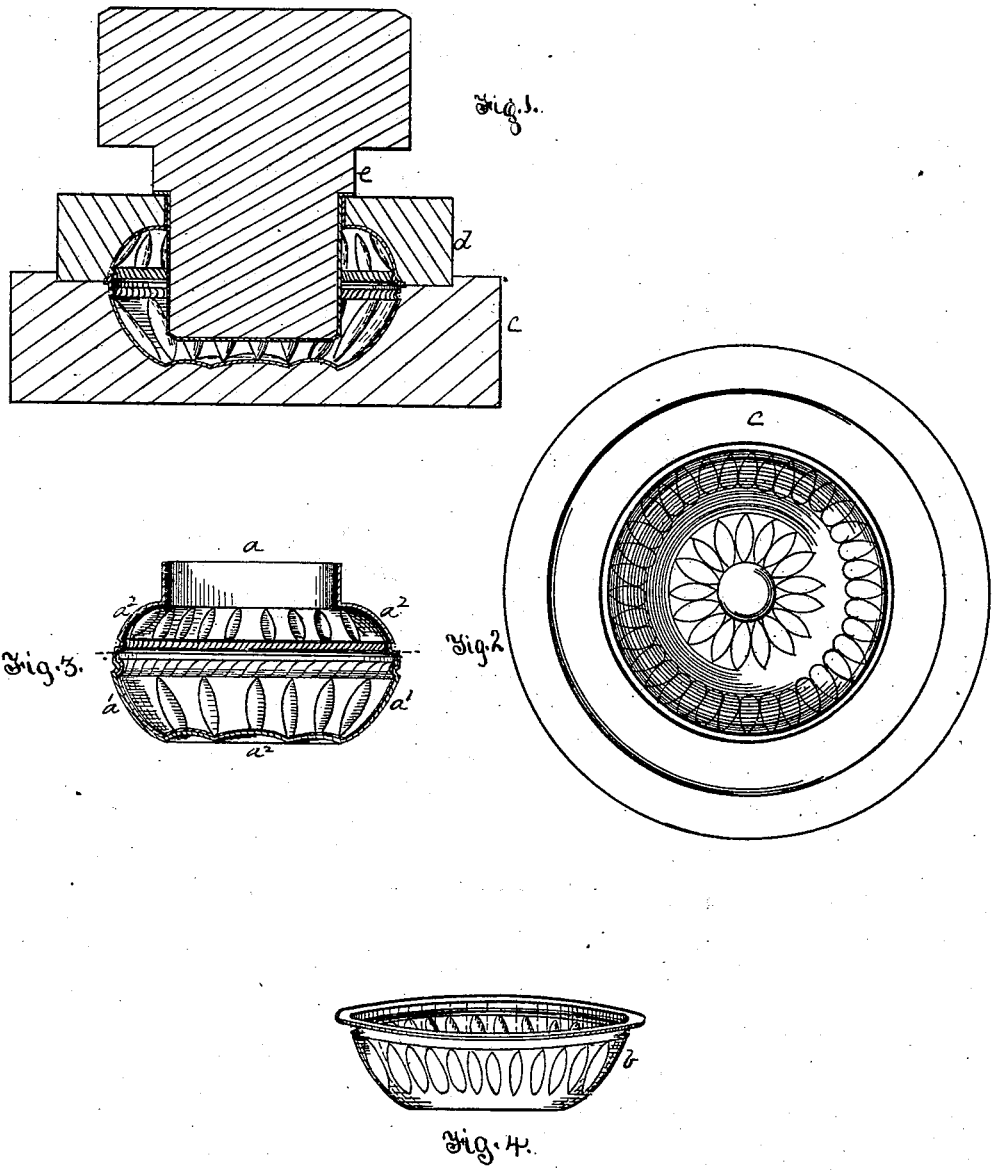
Witnesses
L. C. Fetter
J. K. Smith
Inventor,
Irwin M. O'Donel
by Bakewell & Kerr
Attorneys

United States Patent Office.

IRWIN M. O'DONEL, OF PITTSBURG, PENNSYLVANIA, ASSIGNOR OF ONE-HALF OF HIS RIGHT TO WILLIAM J. FULLERTON, OF SAME PLACE.

MANUFACTURE OF GLASS AND OTHER MOLDS.

SPECIFICATION forming part of Letters Patent No. 226,873, dated April 27, 1880.

Application filed January 2, 1880.

*To all whom it may concern:*

Be it known that I, IRWIN M. O'DONEL, of Pittsburg, in the county of Allegheny and State of Pennsylvania, have invented a new and useful Improvement in the Manufacture of Glass and other Molds; and I do hereby declare the following to be a full, clear, and exact description thereof, reference being had to the accompanying drawings, forming a part of this specification, in which—

Figure 1 is a sectional view of a mold and plunger embodying my invention. Fig. 2 is a plan of the mold. Fig. 3 is a view of the pattern; and Fig. 4 is a view of the shell which constitutes the inner face of the mold.

Like letters of reference indicate like parts.

Glass molds and plungers as heretofore made are subject to the formation on their working-faces of magnetic oxide of iron, owing to the continual heating and cooling to which they are exposed. This oxide is very objectionable, as it gives to the glassware a greasy-looking dull surface, instead of the brilliant one desired. It is therefore customary to remove it whenever practicable, and the most common mode of doing this is to rub it off with fine emery or with a fine-grained sandstone. It is, however, very hard, and the work is one of considerable time and expense, it being customary to clean the molds and plungers after each use. Many molds of the finer patterns are never cleaned, owing to the fact that the cleaning wears or rubs off the edges and fine lines of the pattern, and thus destroys the mold.

My invention is designed to obviate all of this difficulty and expense; and it consists in making molds and plungers with non-oxidizable faces and in the improved method of making them.

To enable others skilled in the art to make use of my invention, I will describe it fully.

I make a pattern of the article for which I desire to produce a mold, preferably of clay, wax, or other suitable substance, and coat it with a thin film of graphite or other conductor upon the side to be imitated. The other parts are left without coating. Such a pattern is seen at $a$, the coated part at $a'$, and the uncoated at $a^2$. I then place this pattern in a bath or solution of platinum, cobalt, or other non-oxidizable metal or alloy, and proceed, in the usual manner of electrotyping, to deposit on it a coating of the metal or alloy. This deposit will be made only on that portion covered with the graphite, as the bare portion is a non-conductor. I then remove it to another tank containing a solution of a baser or cheaper metal or alloy, which is not necessarily non-oxidizable, and deposit a sufficient thickness to form a shell, $b$. I then remove this shell from the pattern and place it in a mold, and, using it as a core, cast to or upon it a sufficient amount of iron to strengthen and preserve it. The mold $c$, thus produced, is then finished externally and on the edges, and is ready for use. Thus I produce a mold having a non-oxidizable surface.

This process of making molds is much cheaper than the old method of cutting out the pattern by hand, and produces a very much more perfect mold.

The ring $d$ and plunger $e$ are made in the same way.

In making two or more part molds the different parts are formed on the same pattern, but not at the same time, being made in successive order by applying the graphite in sections to the pattern until the circuit of the same is completed. In hinged molds the hinges and key-holes are cast in the iron.

My process may also be applied to repairing or renewing old molds. In repairing I immerse the mold in a non-conducting solution, thereby giving it a complete coating, and then scrape clean the part which is to be repaired. I next place it in the metallic solution and deposit the required amount of metal on the exposed part. It is then trimmed and finished, and is ready for use. In like manner the entire inner surface of molds which by constant cleaning and use have become too large may be renewed.

I prefer to use an alloy composed of iridium or platinum and copper, in about the proportions of one-half each, for producing the non-oxidizable surface, but do not limit myself to any particular metal or alloy.

This method may also be used for repairing molds for other purposes, and also for molds for gold and silver ware in which a non-oxidizable face is immaterial.

I do not claim to be the first to make molds by forming a shell by electro-deposition and then casting the body of the mold thereon; but

What I claim as my invention, and desire to secure by Letters Patent, is—

1. The within-described process of making molds and plungers with a non-oxidizable face, consisting of, first, forming a thin film of non-oxidizable metal on the mold-pattern by electro-deposition, then forming a shell or shells by the deposition of a baser metal thereon, and lastly, casting the body of the mold upon such shell or shells, substantially as and for the purposes described.

2. The within-described process of repairing or renewing the molding-surfaces of molds and plungers, consisting of forming on the worn or defective parts a new surface by electro-deposition, substantially as and for the purposes described.

3. A glass-mold having a non-oxidizable metallic molding-face, substantially as and for the purposes described.

4. A plunger for molding glass articles, having a non-oxidizable metallic molding-face, substantially as and for the purposes described.

In testimony whereof I, the said IRWIN M. O'DONEL, have hereunto set my hand.

IRWIN M. O'DONEL.

Witnesses:
JOHN K. SMITH,
JAMES H. PORTE.